United States Patent
Kim et al.

(10) Patent No.: US 7,733,526 B2
(45) Date of Patent: Jun. 8, 2010

(54) METHOD AND APPARATUS FOR CONVERTING INPUT COLOR SPACE INTO CMYK COLOR SPACE

(75) Inventors: Yun-tae Kim, Yongin-si (KR); Heui-keun Choh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 836 days.

(21) Appl. No.: 11/544,640

(22) Filed: Oct. 10, 2006

(65) Prior Publication Data

US 2007/0081178 A1 Apr. 12, 2007

(30) Foreign Application Priority Data

Oct. 12, 2005 (KR) .................. 10-2005-0096212

(51) Int. Cl.
- *G06F 15/00* (2006.01)
- *G06K 1/00* (2006.01)
- *H04N 1/60* (2006.01)
- *H04N 1/46* (2006.01)

(52) U.S. Cl. ...................... 358/1.9; 358/515

(58) Field of Classification Search ............... 358/1.9, 358/1.1, 1.2, 1.6, 515–522
See application file for complete search history.

(56) References Cited

U.S. PATENT DOCUMENTS

| 5,892,891 A * | 4/1999 | Dalal et al. ............... 358/1.9 |
| 2005/0036161 A1 * | 2/2005 | Sasaki ........................ 358/1.9 |

FOREIGN PATENT DOCUMENTS

| JP | 06006620 A | 1/1994 |
| JP | 2000-50092 A | 2/2000 |
| JP | 2002-149149 A | 5/2002 |
| JP | 2003338940 A | 11/2003 |
| JP | 2005026945 A | 1/2005 |
| KR | 20040030122 A | 4/2004 |

\* cited by examiner

*Primary Examiner*—Douglas Q Tran
(74) *Attorney, Agent, or Firm*—Sughrue Mion, PLLC

(57) ABSTRACT

A method and apparatus for converting an input color space into a CMYK color space are provided. The method includes converting a color signal of a predetermined input color space into an sRGB color space, converting the color signal of the sRGB color space into an sRGB L*a*b* color space, and converting the color signal of the sRGB L*a*b* color space into a color signal of a printer-output CMYK color space (CMYKPrinter) using a lookup table.

31 Claims, 10 Drawing Sheets

FIG. 8

| INPUT COLOR SPACE | FIRST HUE SHIFT OPERATION | SECOND HUE SHIFT OPERATION |
|---|---|---|
| SWOP CMYK | Nonlinear Hue Shift | Linear Hue Shift |
| AdobeRGB | Linear Hue Shift | Nonlinear Hue Shift |
| scRGB | Linear Hue Shift | Nonlinear Hue Shift |
| YCC | Linear Hue Shift | Nonlinear Hue Shift |

FIG. 9

| INPUT COLOR SPACE | FIRST GAMUT MAPPING OPERATION | SECOND GAMUT MAPPING OPERATION |
|---|---|---|
| SWOP CMYK | Cusp Mapping | Linear Chroma Clipping |
| AdobeRGB | Linear Chroma Clipping(Extension) | Cusp Mapping |
| scRGB | Linear Chroma Clipping(Extension) | Cusp Mapping |
| YCC | Cusp Mapping | Cusp Mapping |

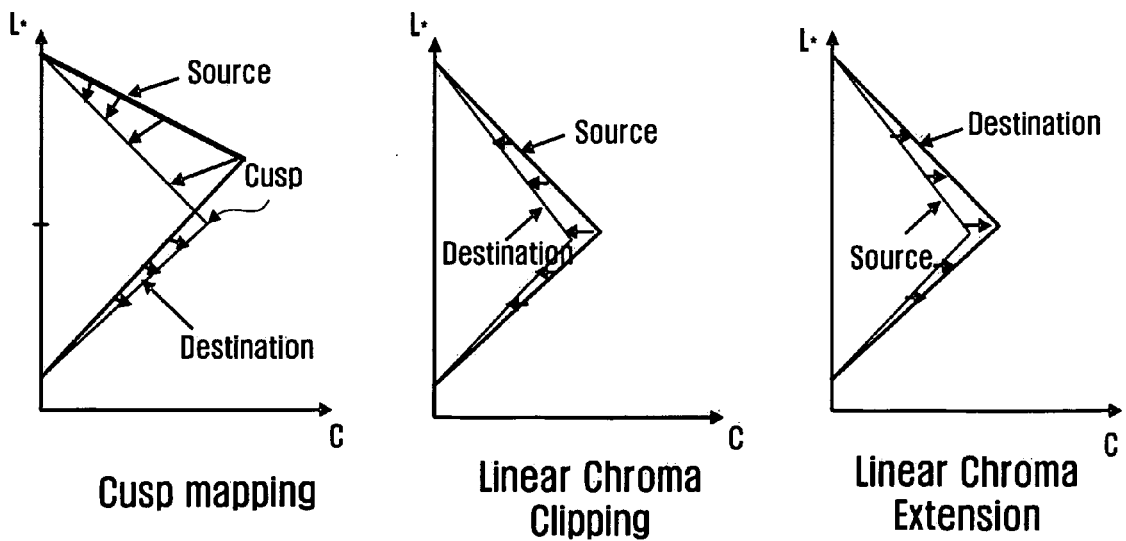

METHOD AND APPARATUS FOR CONVERTING INPUT COLOR SPACE INTO CMYK COLOR SPACE

CROSS REFERENCE TO RELATED APPLICATION

This application claims priority from Korean Patent Application No. 10-2005-0096212 filed on Oct. 12, 2005 in the Korean Intellectual Property Office, the disclosure of which is incorporated herein by reference in its entirety.

BACKGROUND OF THE INVENTION

1. Field of the Invention

Methods and apparatuses consistent with the present invention relate to converting an input color space, and more particularly, to converting a color signal of an input color space into a color signal of a printer-output CMYK color space CMYKPrinter using a L*a*b*sRGB-to-CMYKPrinter lookup table.

2. Description of the Related Art

In order to meet various user demands, the functions of digital image devices such as monitors, scanners, or printers have been diversified and improved. Digital image devices may adopt different color spaces or color models according to their purpose of use.

Color models are classified into device-dependent color models and device-independent color models. Examples of the device-dependent color models include red-green-blue (RGB) models and cyan-magenta-yellow-black (CMYK) color models which are a type of subtraction color space models. Examples of the device-independent color models include Commission Internationale de l'Eclairage (French: International Commission on Illumination—standardization body) (CIE) color models such as a CIEL*a*b* model, a CIE XYZ model, and a CIE LUV model. These CIE color models are theoretical color models developed by the International Commission on Illumination (ICI), which is an organization for developing a set of universal illumination standards. The CIE XYZ model defines a set of three tristimulus values, i.e., R, G, and B values, as a combination of three axes, i.e., the X-axis, the Y-axis, and the Z-axis. CMYK color spaces are widely used in the field of printing, whereas RGB color space are widely used in the field of computer graphics based on computer monitors, e.g., the field of web graphics.

Digital image devices which receive and output digital images may adopt different trichromatic systems to divide and/or synthesize colors, and thus represent the same colors differently. In addition, the type and intensity of trichromatic light may vary from one image display device to another. Thus, image display devices may display the same image signal in different colors from one another. Moreover, printers using different trichromatic inks or different colors of paper from one another may output the same color differently. Since the color mixing principles generally adopted by image display devices are opposite to the color mixing principles generally adopted by printers, a color gamut of image display devices is inevitably different from a color gamut of printers, and thus, image display devices and printers are likely to represent the same image signal in different colors.

In order to address this problem, a variety of techniques for converting a color signal of a color space to be compatible with the color representation properties of digital image devices have been developed. Examples of related color space conversion methods include a method for converting a color signal of an L*a*b* color space into a color signal of a CMYK color space, and a method for converting a color signal of a CMYK color space into a color signal of a C'M'Y'K' color space.

However, in the related L*a*b* color space-to-CMYK color space conversion method, an input color space is converted first into a standard RGB (sRGB) color space regardless of the type of the input color space. Therefore, the related L*a*b* color space-to-CMYK color space conversion method may not be able to produce optimum color space conversion results for various types of input color spaces such as a Specifications for Web Offset Publications (SWOP) CYMK color space, an Adobe RGB color space, and an scRGB color space. The related CMYK color space-to-C'M'Y'K' color space conversion method cannot be applied to input color signals which belong to an RGB color space (such as an sRGB color space, an Adobe RGB color space, or an scRGB color space) but can only be applied to input color signals which belong to an CMYK color space.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for converting an input color space into a CMYK color space which can enable printers to realize optimum colors regardless of an input color space by converting a color signal of an sRGB L*a*b* color space, which is obtained from a variety of input color spaces, into a color signal of a printer-output CMYK color space using a lookup table.

However, the objectives of the present invention are not restricted to the one set forth herein. The above and other objectives of the present invention will become more apparent to one of daily skill in the art to which the present invention pertains by referencing a detailed description of the present invention given below.

According to an aspect of the present invention, there is provided a method of converting an input color space into a CMYK color space. The method includes (a) converting a color signal of an input color space into a standard RGB (sRGB) color space, (b) converting the color signal of the sRGB color space into an sRGB L*a*b* color space, and (c) converting the color signal of the sRGB L*a*b* color space into a color signal of a printer-output CMYK color space (CMYKPrinter) using a lookup table.

According to another aspect of the present invention, there is provided an apparatus for converting an input color space into a CMYK color space. The apparatus includes a first conversion unit which converts a color signal of a input color space into an sRGB color space, a second conversion unit which converts the color signal of the sRGB color space into an sRGB L*a*b* color space, and a third conversion unit which converts the color signal of the sRGB L*a*b* color space into a color signal of a printer-output CMYK color space (CMYKPrinter) using a lookup table.

BRIEF DESCRIPTION OF THE DRAWINGS

The above and other aspects of the present invention will become more apparent by describing in detail exemplary embodiments thereof with reference to the attached drawings in which:

FIG. 8 is a diagram of a table presenting various types of input color spaces and the types of hue shift methods which can be used to perform the first and second hue shift operations for each of the various types of input color spaces; and FIG. 9 illustrates a table presenting various types of input color spaces and the types of gamut mapping methods which can be used to perform the first and second gamut mapping operations for each of the various types of input color spaces and explains examples of the gamut mapping methods used to perform the first and second gamut mapping operations.

DETAILED DESCRIPTION OF THE EXEMPLARY EMBODIMENTS OF THE INVENTION

Figure 1:
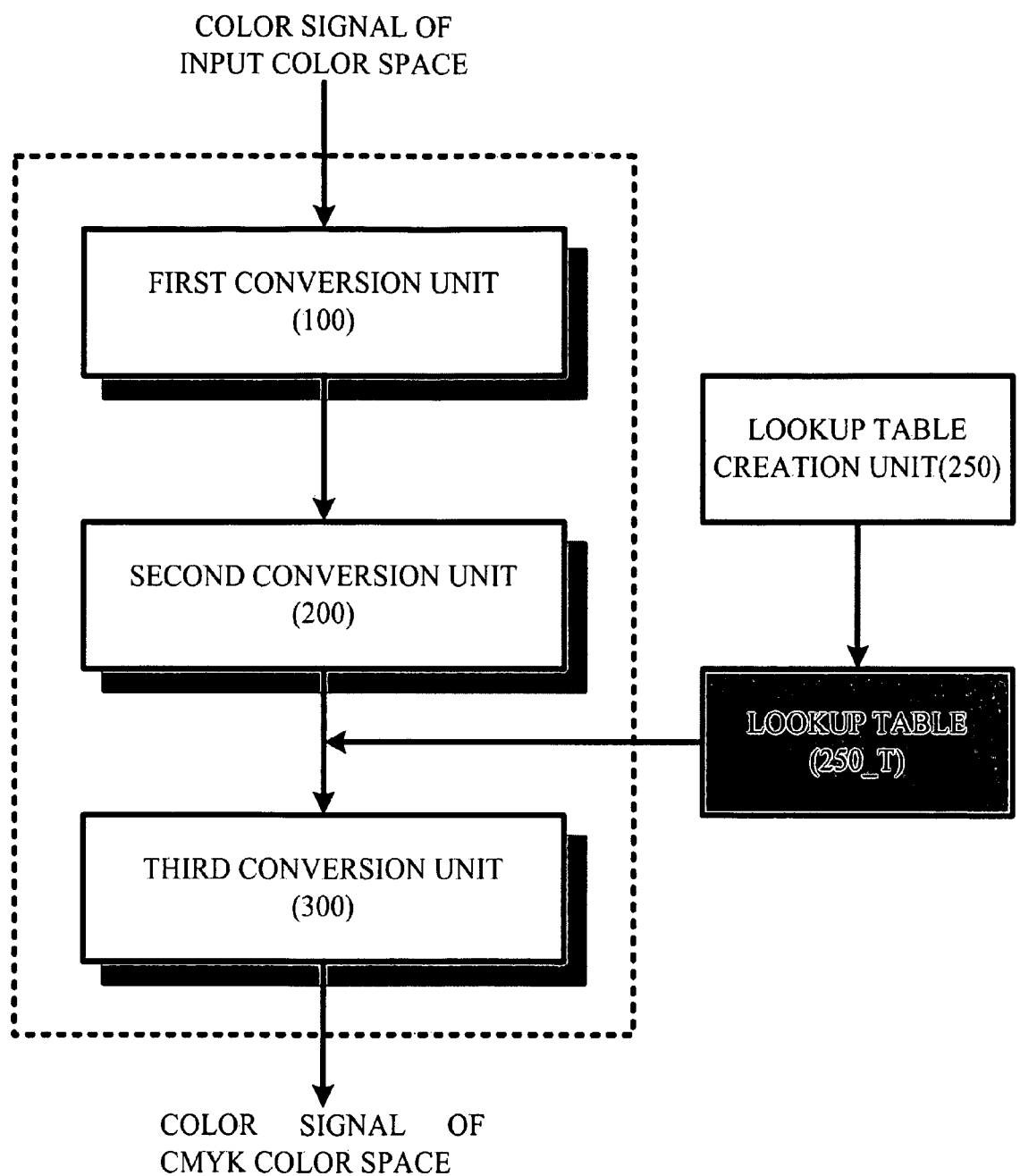
FIG. 1 is a block diagram of an apparatus for converting an input color space into a CMYK color space according to an exemplary embodiment of the present invention.

The present invention will now be described more fully with reference to the accompanying drawings, in which exemplary embodiments of the invention are shown.

The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Like reference numerals in the drawings denote like elements, and thus their description will be omitted.

A method and apparatus for converting an input color space into a CMYK color space according to an exemplary embodiment of the present invention will hereinafter be described in detail with reference to the accompanying block diagrams and flowcharts. A plurality of blocks of the accompanying block diagrams and a plurality of operational steps of the accompanying flowcharts may be executed by computer program instructions. The computer program instructions may be uploaded to general purpose computers, special purpose computers, or processors of other programmable data processing devices. When being executed by general purpose computers, special purpose computers, or processors of other programmable data processing devices, the computer program instructions can implement in various ways the functions specified in the accompanying block diagrams or flowcharts.

Also, the computer program instructions can be stored in computer-readable memories which can direct computers or other programmable data processing devices to function in a particular manner. When stored in computer-readable memories, the computer program instructions can produce an article of manufacture including instruction means which implement the functions specified in the accompanying block diagrams and flowcharts. The computer program instructions may also be loaded onto computers or other programmable data processing devices to allow the computers or other programmable data processing devices to realize a series of operational steps and to produce computer-executable processes. Thus, when being executed by computers or other programmable data processing devices, the computer program instructions provide steps for implementing the functions specified in the accompanying block diagrams and flowcharts.

The blocks of the accompanying block diagrams or the operational steps of the accompanying flowcharts may be represented by modules, segments, or portions of code which comprise one or more executable instructions for executing the functions specified in the respective blocks of operational steps of the accompanying block diagrams and flowcharts. The functions specified in the accompanying block diagrams and flowcharts may be executed in a different order from those set forth herein. For example, two adjacent blocks or operational steps in the accompanying block diagrams or flowcharts may be executed at the same time or in a different order from that set forth herein.

FIG. 1 is a block diagram of an apparatus for converting an input color space into a CMYK color space according to an exemplary embodiment of the present invention. Referring to FIG. 1, the apparatus includes a first conversion unit 100, a second conversion unit 200, and a third conversion unit 300. A lookup table creation unit 250 and a lookup table 250_T generated by the lookup table creation unit 250 are located outside the apparatus.

The first conversion unit 100 converts a color signal of an arbitrary input color space into a color signal of a standard RGB (sRGB) color space. A color space is a method that defines a plurality of colors, i.e., represents the relationships among a plurality of colors. Examples of the color signal of the arbitrary input color space include a color signal of an Adobe RGB color space, a color signal of an scRGB color space, a color signal of a YCC color space, a color signal of a CMYK color space, a color signal of a CIE L*a*b* color space, and a color signal of a CIE XYZ color space.

The second conversion unit 200 converts the color signal of the sRGB color space produced by the first conversion unit 100 into a color signal of an L*a*b* color space L*a*b*sRGB (hereinafter referred to as the sRGB L*a*b* color space) for sRGB color data. The second conversion unit 200 may use an sRGB profile or a display profile comprising an sRGB-to-L*a*b* lookup table to convert the color signal of the sRGB color space produced by the first conversion unit 100 into a color signal of the sRGB L*a*b* color space L*a*b*sRGB.

The third conversion unit 300 converts the color signal of the sRGB L*a*b* color space L*a*b*sRGB produced by the second conversion unit 200 into a color signal of a printer-output CMYK color space CMYKPrinter using the lookup table 250_T, i.e., an L*a*b*sRGB-to-CMYKPrinter lookup table.

The lookup table creation unit 250 creates the lookup table 250_T which is used for converting the color signal of the sRGB L*a*b* color space L*a*b*sRGB produced by the second conversion unit 200 into a color signal of the printer-output CMYK color space CMYKPrinter.

Figure 2:
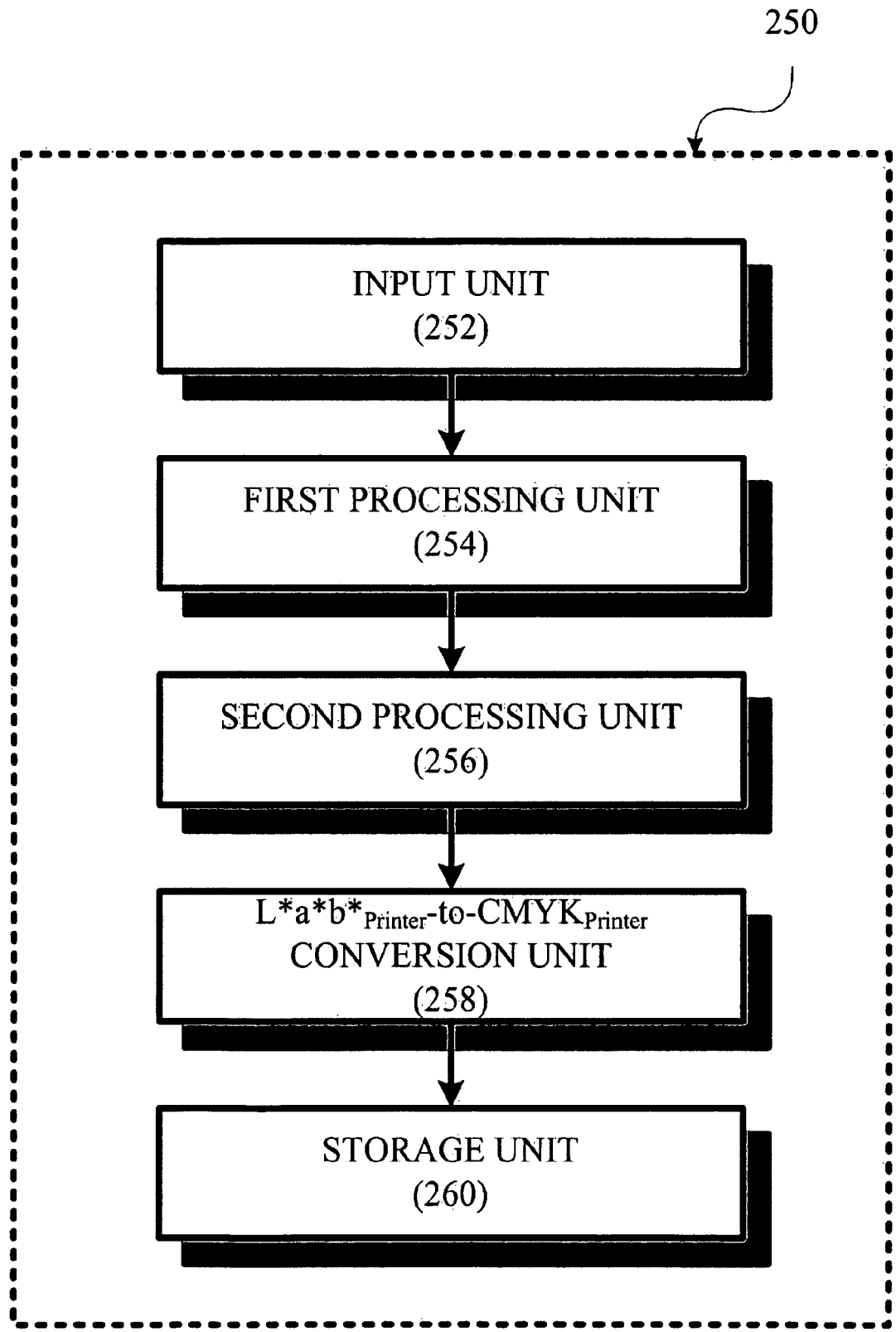
FIG. 2 is a block diagram of a lookup table creation unit illustrated in FIG. 1.

FIG. 2 is a block diagram of the lookup table creation unit 250 illustrated in FIG. 1. Referring to FIG. 2, the lookup table creation unit 250 includes an input unit 252, a first processing unit 254, a second processing unit 256, an L*a*b*sRGB-to-CMYKPrinter conversion unit 258, and a storage unit 260.

The input unit 252 receives a color signal of an sRGB L*a*b* color space L*a*b*sRGB for N*N*N sRGB data which is formed in an L*a*b* color space as N*N*N lattice points.

The first processing unit 254 converts the color signal of the sRGB L*a*b* color space L*a*b*sRGB into a color signal of an input color space L*a*b*IN, which is an original color space input to the first conversion unit 100, by performing a first process. The first process includes a first hue shift operation in which a hue domain of the color signal of the sRGB L*a*b* color space L*a*b*sRGB is shifted to a hue domain of the input color space L*a*b*IN using a proportional expression, and a first gamut mapping operation by which the color gamut of the sRGB L*a*b* color space L*a*b*sRGB is mapped to the color gamut of the input color space L*a*b*IN. Here, the color gamut of a color space is a range of colors that can be represented by the color space.

Since the hues of pure colors R, G, B, C, M, and Y of an sRGB color space differ from the hues of pure colors R, G, B, C, M, and Y of the input color space L*a*b*IN, the first hue shift operation is performed in order to conform the hues of the pure colors R, G, B, C, M, and Y of the sRGB color space to the hues of the pure colors R, G, B, C, M, and Y of the input color space L*a*b*IN. Also, since the color gamut of color data of the sRGB L*a*b* color space L*a*b*sRGB differs from the color gamut of color data of the input color space L*a*b*IN, the first gamut mapping operation is performed to conform lattice point data of the sRGB L*a*b* color space L*a*b*sRGB to the input color space L*a*b*IN.

The second processing unit 256 converts the color signal of the input color space L*a*b*IN produced by the first processing unit 254 into a color signal of the printer-output L*a*b* color space L*a*b*Printer by performing a second process. The second process includes a second hue shift operation in which a hue domain of the color signal of the input color space L*a*b*IN produced by the first processing unit 254 is shifted to a hue domain of the printer-output L*a*b* color space L*a*b*Printer using a proportional expression, and a second gamut mapping operation by which the color gamut of the input color space L*a*b*IN is mapped to the color gamut of the printer-output L*a*b* color space L*a*b*Printer.

Since the hues of the pure colors R, G, B, C, M, and Y of the input color space L*a*b*IN differ from the hues of pure colors R, G, B, C, M, and Y of the printer-output L*a*b* color space L*a*b*Printer, the second hue shift operation is performed in order to conform the hues of the pure colors R, G, B, C, M, and Y of the input color space L*a*b*IN to the hues of the pure colors R, G, B, C, M, and Y of the printer-output L*a*b* color space L*a*b*Printer. Also, since the color gamut of color data of the input color space L*a*b*IN differs from the color gamut of color data of the printer-output L*a*b* color space L*a*b*Printer, the second gamut mapping operation is performed to conform lattice point data of the input color space L*a*b*IN to the printer-output L*a*b* color space L*a*b*Printer. The first and second processes will be described later in further detail together with a method of converting an input color space into a CMYK color space according to an exemplary embodiment of the present invention.

Examples of the input color space L*a*b*IN include a Specifications for Web Offset Publications (SWOP) CMYK color space, an Adobe RGB color space, an scRGB color space, and a YCC color space. The types of hue shift methods which can be used to perform the first and second hue shift operations for such various types of input color spaces will hereinafter be described in detail.

If the input color space L*a*b*IN is a SWOP CMYK color space, the first hue shift operation may be performed using a nonlinear hue shift method, and the second hue shift operation may be performed using a linear hue shift method. If the input color space L*a*b*IN is an Adobe RGB color space, an scRGB color space or a YCC color space, the first hue shift operation may be performed using the linear hue shift method, and the second hue shift operation may be performed using the nonlinear hue shift method.

The types of gamut mapping methods which can be used to perform the first and second gamut mapping operations are dependent on the type of the input color space L*a*b*IN. For example, if the input color space L*a*b*IN is a SWOP CMYK color space, the first gamut mapping operation may be performed using a cusp mapping method, and the second gamut mapping operation may be performed using a linear chroma clipping method. If the input color space L*a*b*IN is an Adobe RGB color space or an scRGB color space, the first gamut mapping operation may be performed using the linear chroma clipping method or a linear chroma extension method, and the second gamut mapping operation may be performed using the cusp mapping method. If the input color space L*a*b*IN is a YCC color space, the first and second gamut mapping operations may be both performed using the cusp mapping method.

The L*a*b*sRGB-to-CMYKPrinter conversion unit 258 converts the color signal of the printer-output L*a*b* color space L*a*b*Printer produced by the second processing unit 256 into a color signal of a printer-output CMYK color space CMYKPrinter using an L*a*b*sRGB-to-CMYKPrinter lookup table. The L*a*b*sRGB-to-CMYKPrinter lookup table is created based on a plurality of color signals of an L*a*b* color space which are obtained by color-measuring color patches of a CMYK color space. The conversion performed by the L*a*b*sRGB-to-CMYKPrinter conversion unit 258 may involve the use of an interpolation method.

The storage unit 260 stores the color signal of the sRGB L*a*b* color space L*a*b*sRGB received by the input unit 252 and the color signal of the printer-output CMYK color space CMYKPrinter produced by the L*a*b*sRGB-to-CMYKPrinter conversion unit 258 at one of the N*N*N lattice points of the lookup table 250_T.

Figure 3:
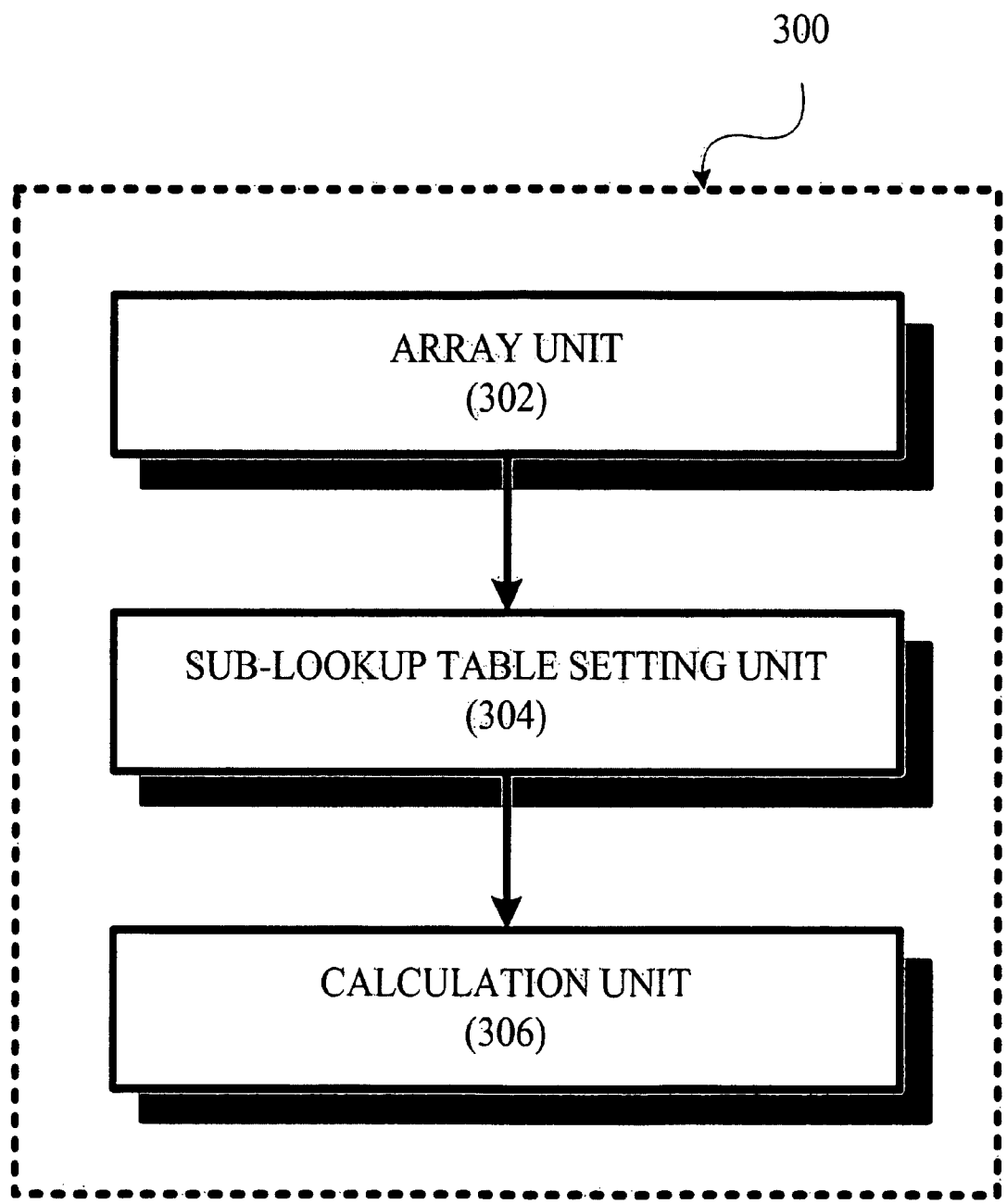
FIG. 3 is a block diagram of a third conversion unit illustrated in FIG. 1.

FIG. 3 is a block diagram of the third conversion unit 300 illustrated in FIG. 1. Referring to FIG. 3, the third conversion unit 300 includes an array unit 302, a sub-lookup table setting unit 304, and a calculation unit 306.

The array unit 302 arrays a color signal of the sRGB L*a*b* color space L*a*b*sRGB in the lookup table 250_T, which is comprised of N*N*N lattice points.

The sub-lookup table setting unit 304 sets as a sub-lookup table a minimum cube comprised of a plurality of lattice points that surround a coordinate point corresponding to the arrayed color signal. If the coordinate point corresponding to the arrayed color signal does not coincide with any of the N*N*N lattice points of the lookup table 250_T, the sub-lookup table may be defined as a cube comprised of 8 lattice points.

The calculation unit 306 calculates a printer-output CMYK value of the coordinate point corresponding to the arrayed color signal, using a plurality of data respectively stored at the lattice points of the sub-lookup table.

In this disclosure, the terms 'unit', 'module', and 'table' refer to a software program or a hardware device (such as a field programmable gate array (FPGA) or an application specific integrated circuit (ASIC)) which performs a specific function. However, the present invention is not restricted to this. In particular, modules may be implemented in a storage medium which can be addressed or may be configured to be able to execute one or more processors. Examples of the modules include software components, object-oriented software components, class components, task components, processes, functions, attributes, procedures, sub-routines, program code segments, drivers, firmware, microcode, circuits, data, databases, data architecture, tables, arrays, and variables. The functions provided by components or modules may be integrated with one another so that they can executed by a smaller number of components or modules or may be divided into smaller functions so that they need additional components or modules. Also, components or modules may be realized to drive one ore more CPUs in a device.

An operation of the apparatus illustrated in FIG. 1 according to an exemplary embodiment of the present invention will hereinafter be described in detail with reference to FIG. 4.

Figure 4:
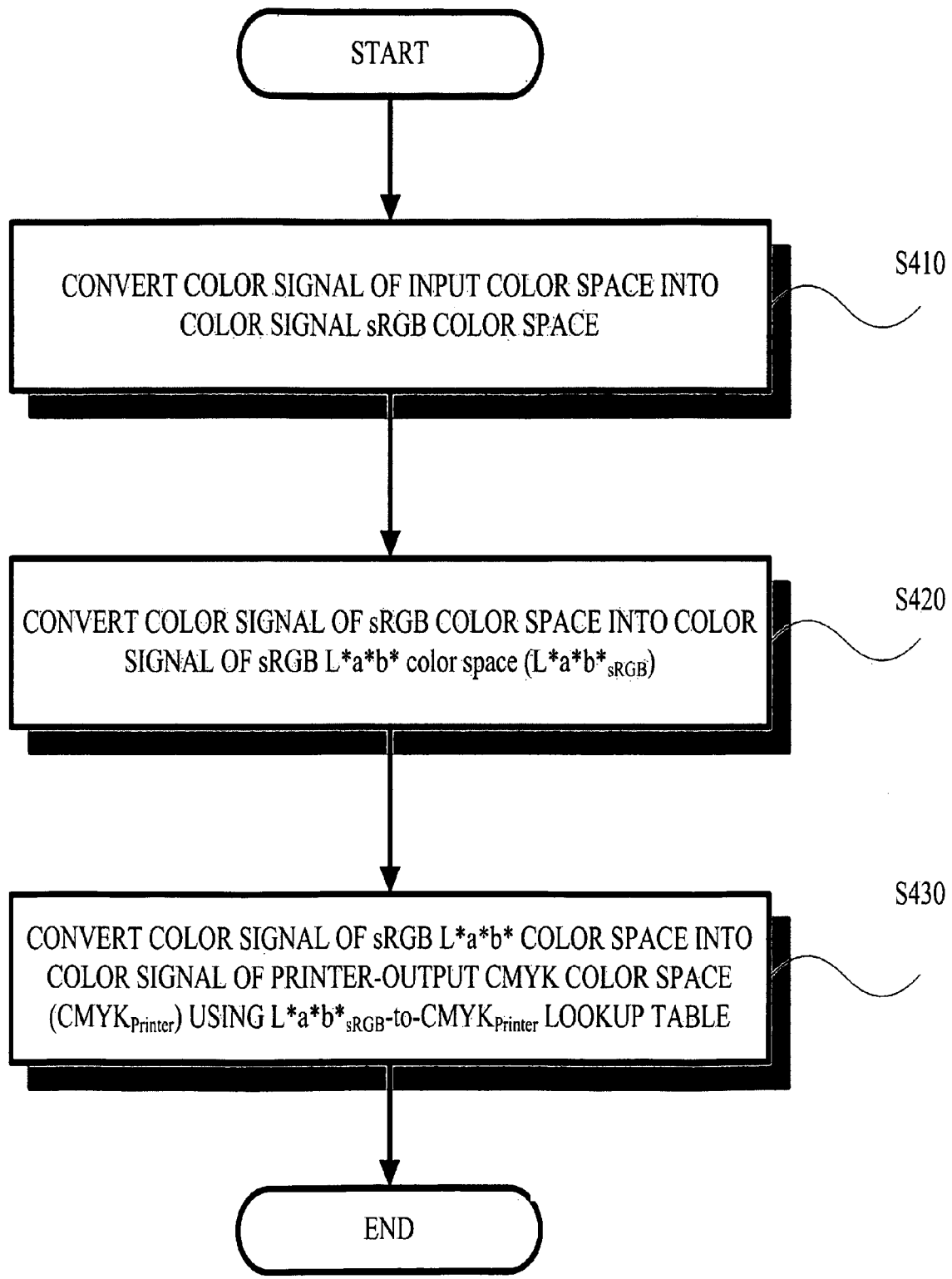
FIG. 4 is a flowchart illustrating a method of converting an input color space into CMYK color space according to an exemplary embodiment of the present invention.

FIG. 4 is a flowchart illustrating a method of converting an input color space into a CMYK color space according to an exemplary embodiment of the present invention. Referring to FIG. 4, in operation S410, the first conversion unit 100 receives a color signal of an input color space L*a*b*IN into a color signal of an sRGB color space. Color signal data of an input color space is generally converted to the sRGB color space by an operating system (OS) or an application program of a computer. Here, the color signal of the input color space L*a*b*IN may be a color signal of an Adobe RGB color space, a color signal of an scRGB color space, a color signal of a YCC color space, or a color signal of a CMYK color space, as described above.

In operation S420, the second conversion unit 200 converts the color signal of the sRGB color space produced in operation S410 into a color signal of an sRGB L*a*b* color space L*a*b*sRGB using, for example, an sRGB profile or a display profile which comprises an sRGB-to-L*a*b* lookup table.

The lookup table 250_T, which is used to convert a color signal of the sRGB L*a*b* color space L*a*b*sRGB into a color signal of the printer-output CMYK color space CMYK-Printer, is created by the lookup table creation unit 250 before the conversion of the color signal of the sRGB color space produced in operation S416 into a color signal of the sRGB L*a*b* color space L*a*b*sRGB. The creation of the lookup table 250_T will hereinafter be described in further detail with reference to FIG. 5.

Figure 5:
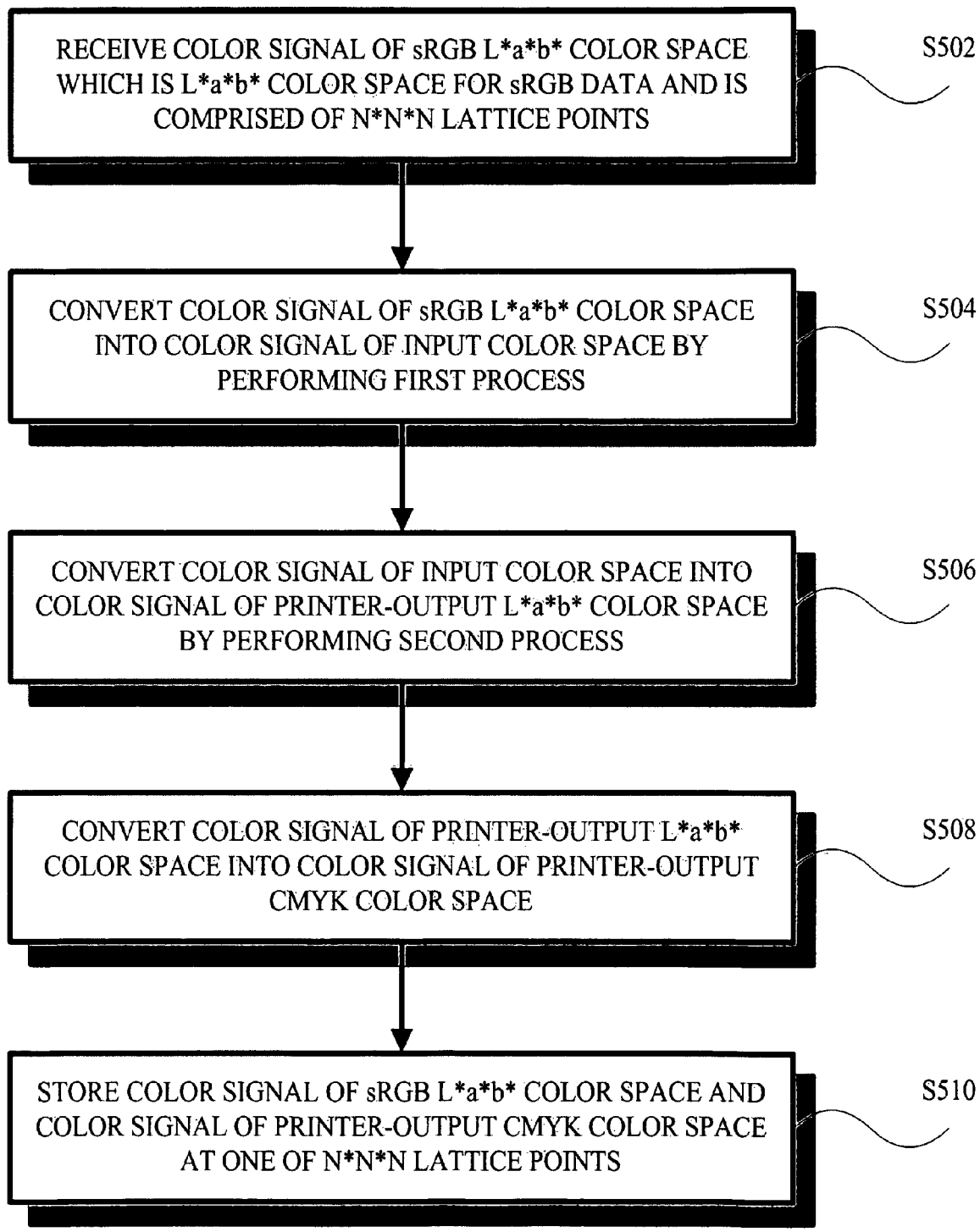
FIG. 5 is a flowchart illustrating the creation of an L*a*b*sRGB-to-CMYKPrinter lookup table used in the method illustrated in FIG. 4.

FIG. 5 is a flowchart illustrating the creation of the lookup table 250_T used in the method illustrated in FIG. 4. Referring to FIG. 5, in operation S502, the input unit 252 inputs a color signal of the sRGB L*a*b* color space L*a*b*sRGB, which is an L*a*b* color space for sRGB data and is comprised of N*N*N data spaces, i.e., N*N*N lattice points, where N is an arbitrary natural number. For example, the data space comprised of N*N*N lattice points may be a 17*17*17 data space or a 33*33*33 data space. In operation S504, the first processing unit 254 converts the color signal of the sRGB L*a*b* color space L*a*b*sRGB into a color signal of the input color space L*a*b*IN by performing a first process, which includes a first hue shift operation and a first gamut mapping operation. The conversion of the color signal of the sRGB L*a*b* color space L*a*b*sRGB into a color signal of the input color space L*a*b*IN is performed in order for a printer to output colors that are most similar to original colors of various types of input color spaces by properly reflecting the properties of the various types of input color spaces. The first process will hereinafter be described later in further detail with reference to FIG. 7A.

Figure 7A:
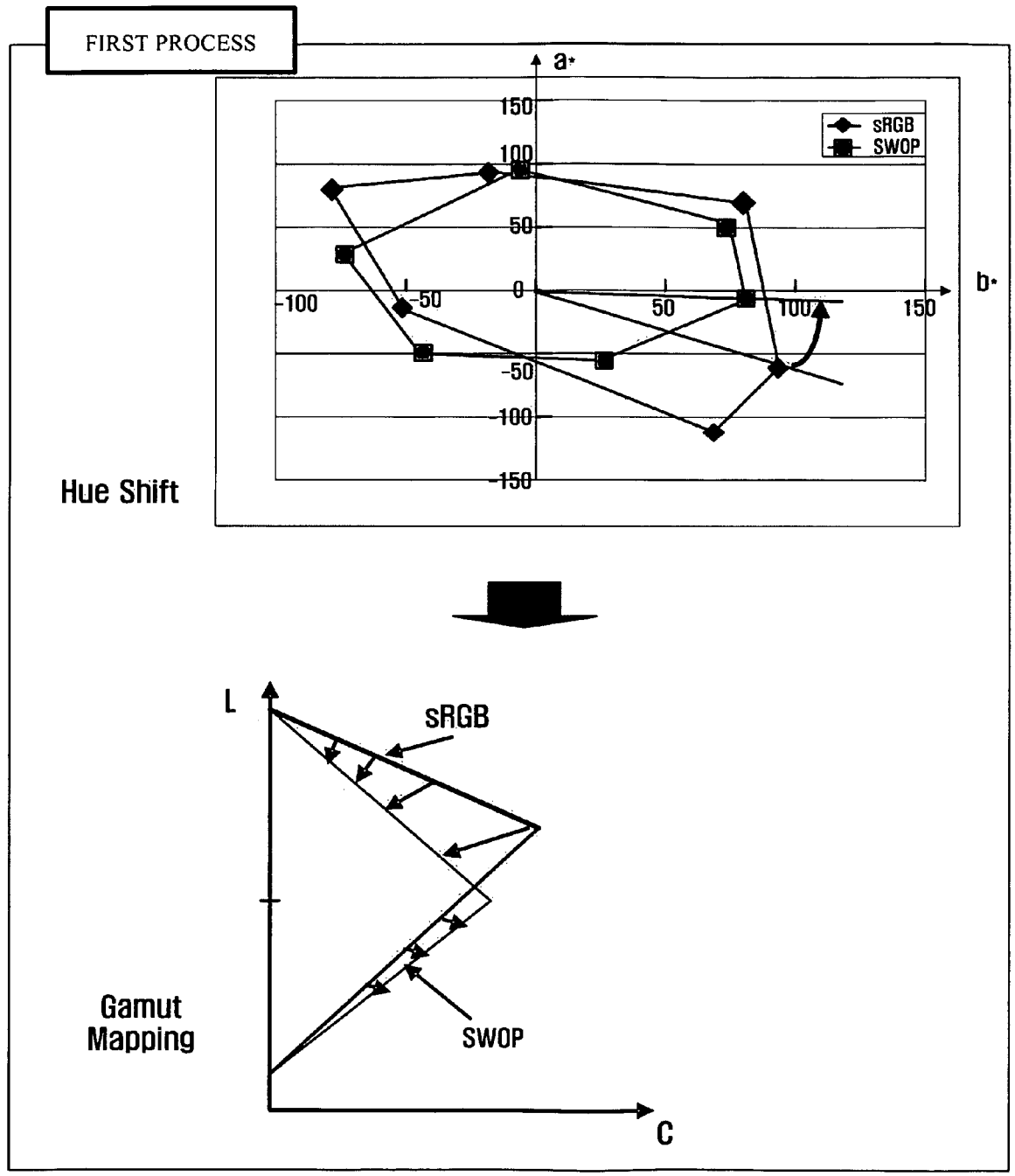
FIG. 7A is a diagram for explaining a first process according to an exemplary embodiment of the present invention.

FIG. 7A is a diagram for explaining the first process according to an exemplary embodiment of the present invention. Referring to FIG. 7A, it is assumed that the input color space L*a*b*IN is a SWOP color space. Referring to the upper graph of FIG. 7A, the horizontal axis represents the hue scale of b*, the vertical axis represents the hue scale of a*, sRGB hues are represented by dark diamonds, and SWOP hues are represented by gray rectangles. In the SWOP color space L*a*b*IN, the angles of sRGB pure colors with respect to the origin do not coincide with the angles of SWOP pure colors with respect to the origin. Thus, in order to conform the sRGB pure colors to the SWOP pure colors, an SRGB hue domain is shifted such that the result of the shifting can coincide with an SWOP hue domain. For example, if sRGB hues do not coincide with respective corresponding SWOP hues in a magenta area and a plurality of lattice points of an sRGB L*a*b* color space L*a*b*sRGB are located inside the magenta area, an sRGB magenta area may be set to the range between source 1 and source 2, an SWOP magenta area may be set to the range between destination 1 and destination 2, and an proportional expression may be established based on the range of the sRGB magenta area and the range of the SWOP magenta area. Thereafter, a hue into which a hue in the sRGB magenta is to be converted through a first hue shift operation is determined using the proportional expression.

The lower graph of FIG. 7A explains a first gamut mapping operation. Referring to the lower graph of FIG. 7A, an sRGB color gamut does not coincide with an SWOP color gamut. Thus, the first gamut mapping operation is performed in order to conform a plurality of lattice points of the sRGB L*a*b* color space L*a*b*sRGB to the SWOP color gamut and thus properly reflect the properties of the SWOP color gamut. If the sRGB color gamut is larger than the SWOP color gamut, a gamut clipping method may be used. On the other hand, if the sRGB color gamut is smaller than the SWOP color gamut, a gamut extension method may be used. Referring to the lower graph of FIG. 7A, the first gamut mapping operation is performed using a cusp mapping method which is a type of gamut extension method.

Referring to FIG. 5, in operation S506, the second processing unit 256 converts the color signal of the input color space L*a*b*IN into a color signal of the printer-output L*a*b* color space L*a*b*Printer by performing a second process, which includes a second hue shift operation and a second gamut mapping operation. The second process will hereinafter be described in further detail with reference to FIG. 7B.

Figure 7B:
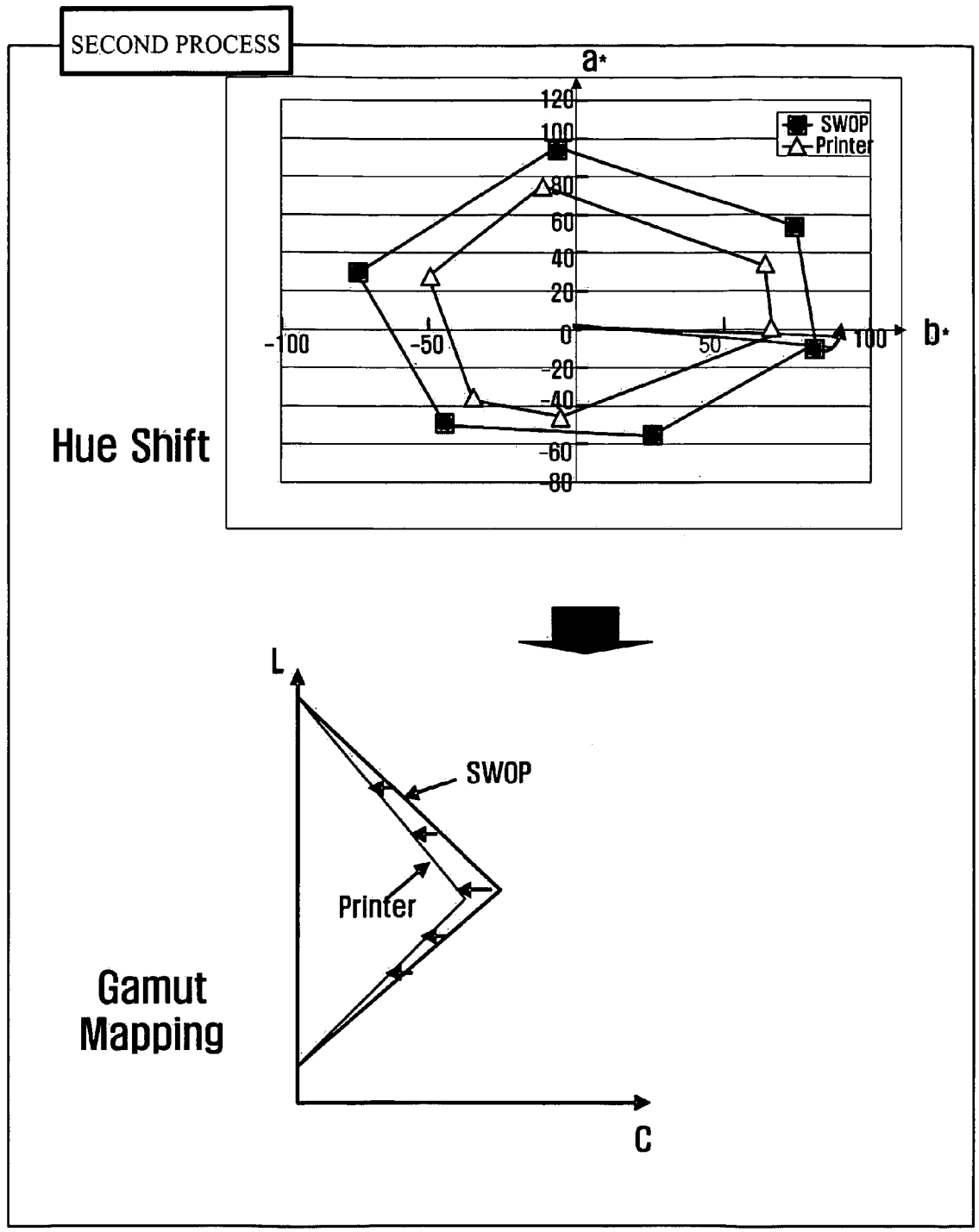
FIG. 7B is a diagram for explaining a second process according to an exemplary embodiment of the present invention.

FIG. 7B is a diagram for explaining the second process according to an exemplary embodiment of the present invention. Referring to FIG. 7B, it is assumed that the input color space L*a*b*IN is a SWOP color space. Referring to the upper graph of FIG. 7B, the horizontal axis represents the hue scale of b*, the vertical axis represents the hue scale of a*, SWOP hues are represented by dark rectangles, and pure colors of a printer are represented as less light triangles. In the input color space L*a*b*IN, the SWOP pure colors do not coincide with the respective printer pure colors. Thus, in order to conform the SWOP pure colors to the printer pure colors, a second hue shift operation is performed.

The lower graph of FIG. 7B explains a second gamut mapping operation. Referring to the lower graph of FIG. 7B, an SWOP color gamut does not coincide with a printer color gamut. Thus, the second gamut mapping operation is performed in order to conform a plurality of lattice points of an SWOP L*a*b* color space L*a*b*SWOP to the printer color gamut. If the SWOP color gamut is larger than the printer color gamut, a gamut clipping method may be used. On the other hand, if the SWOP color gamut is smaller than the printer color gamut, a gamut extension method may be used. Referring to the lower graph of FIG. 7B, the second gamut mapping operation is performed using the gamut clipping method.

In the meantime, the types of hue shift methods which can be used to perform the first and second hue shift operations are determined according to the type of the input color space L*a*b*IN, and this will hereinafter be described in detail with reference to FIG. 8.

FIG. 8 is a diagram of a table presenting various types of input color spaces and the types of hue shift methods which can be used to perform the first and second hue shift operations for each of the various types of input color spaces. Referring to FIG. 8, if the input color space L*a*b*IN is a SWOP CMYK color space, the first hue shift operation may be performed using a nonlinear hue shift method, and the second hue shift operation may be performed using a linear hue shift method. In detail, the hues of SWOP pure colors considerably differ from the hues of respective corresponding sRGB pure colors when the input color space L*a*b*IN, i.e., an SWOP CMYK color space, is forcibly converted into an sRGB color space by an operating system (OS) and then the sRGB color space is forcibly converted back into an SWOP CMYK color space by the OS. Thus, the first hue shift operation can be performed using the nonlinear hue shift method. On the other hand, if the input color space L*a*b*IN is an Adobe RGB color space, an scRGB color space, or a YCC color space, the first hue shift operation may be performed using the linear hue shift method, and the second hue shift operation may be performed using the nonlinear hue shift method. In detail, the hues of Adobe RGB pure colors, scRGB pure colors, or YCC pure colors only slightly differ from the hues of respective corresponding sRGB pure colors when the input color space L*a*b*IN, i.e., an Adobe RGB color space, an scRGB color space, or a YCC color space, is forcibly converted into an sRGB color space by an OS and then the sRGB color space is forcibly converted back into whichever of an Adobe RGB color space, an scRGB color space, or an YCC color space is of the same type as the input color space L*a*b*IN by the OS. Thus, the first hue shift operation can be performed using the linear hue shift method. The calculation of hue values using either the linear hue shift method or the nonlinear hue shift method is obvious to one of ordinary skill in the art to which the present invention pertains, and thus, its detailed description will be omitted.

In the meantime, the types of gamut mapping methods which can be used to perform the first and second gamut mapping operations are determined according to the type of the input color space L*a*b*IN, and this will hereinafter be described in detail with reference to FIG. 9.

FIG. 9 illustrates a table presenting various types of input color spaces and the types of gamut mapping methods which can be used to perform the first and second gamut mapping operations for each of the various types of input color spaces and explains examples of the gamut mapping methods used to perform the first and second gamut mapping operations. Color representation devices may have different color gamuts from one another. Thus, when a color image represented by a source color representation device having a large color gamut is represented by a target color representation device having a small color gamut, portions of the color image corresponding to colors outside the color gamut of the target color representation device may be improperly represented.

Therefore, if the color gamut of a source representation device which provides an input color signal differs from the color gamut of a target representation device, the input color signal must be appropriately converted by performing a gamut mapping operation. A plurality of typical gamut mapping methods will hereinafter be described in detail with reference to three graphs illustrated in the lower part of FIG. 9.

The left graph of FIG. 9 explains a cusp mapping method. The cusp mapping method may be used when the location of a cusp of a source color gamut is much different from the location of a cusp of a destination color gamut. In the cusp mapping method, color data in the source color gamut is mapped to color data in the destination color gamut such that the cusp of the source color gamut can coincide with the cusp of the destination color gamut. Here, the term "cusp" refers to a maximum hue value.

The middle graph of FIG. 9 illustrates a linear chroma clipping method. The linear chroma clipping method may be used when the cusp of the source color gamut is not much distant apart from the cusp of the source color gamut and the source color gamut is large enough to include the entire destination color gamut. In the linear chroma clipping method, color data which is inside the source color gamut and outside the destination color gamut is mapped to color data on the boundaries of the destination color gamut.

The right graph of FIG. 9 illustrates a linear chroma extension method. The linear chroma extension method may be performed when the cusp of the source color gamut is not much distant apart from the cusp of the source color gamut and the destination color gamut is large enough to include the entire source color gamut. In the linear chroma extension method, color data in the source color gamut is mapped to color data in the destination color gamut using a ratio between the boundaries of the source color gamut and the boundaries of the destination color gamut. In this regard, the linear chroma extension method is opposite to the linear chroma clipping method.

Referring to the table of FIG. 9, if the input color space L*a*b*IN is an SWOP CMYK color space, the first gamut mapping operation may be performed using the cusp mapping method, and the second gamut mapping operation may be performed using the linear chroma clipping method. In detail, a cusp of an SWOP color gamut is distant apart from a cusp of an sRGB color gamut when the input color space L*a*b*IN, i.e., an SWOP CMYK color space, is forcibly converted into an sRGB color space by an OS and then the sRGB color space is forcibly converted back into an SWOP CMYK color space by the OS. Thus, the first gamut mapping operation is performed using the cusp mapping method by which the cusp of the sRGB color gamut is mapped toward the cusp of the SWOP color gamut. The second gamut mapping operation is performed to convert a SWOP color space into a printer color space. Since the SWOP color gamut is similar to a printer color gamut, the second gamut mapping operation is performed using the linear chroma clipping method.

If the input color space L*a*b*IN is an Adobe RGB color space or an scRGB color space, the first gamut mapping operation may be performed using the linear chroma clipping method or the linear chroma extension method, and the second gamut mapping operation may be performed using the cusp mapping method. A cusp of an RGB color gamut is not much distant apart from a cusp of an sRGB color gamut when the input color space L*a*b*IN, i.e., an RGB color space, is forcibly converted into an sRGB color space by an OS and then the sRGB color space is forcibly converted back into an RGB color space by the OS. Thus, if the input color space L*a*b*IN is an Adobe RGB color space or an scRGB color space and the sRGB color gamut is larger than the RGB color gamut, the first gamut mapping operation may be performed using the linear chroma clipping method.

On the other hand, if the input color space L*a*b*IN is an Adobe RGB color space or an scRGB color space and the sRGB color gamut is smaller than the RGB color gamut, the first gamut mapping operation may be performed using the linear chroma extension method. Since a cusp of the RGB color gamut is not much distant apart from a cusp of a printer color gamut when an RGB color space is converted into a printer-output color space, the second gamut mapping operation is performed using the cusp mapping method by which the cusp of the RGB color gamut is mapped toward the cusp of the printer color gamut.

If the input color space L*a*b*IN is a YCC color space, the first and second gamut mapping operations may be both performed using the cusp mapping method. In detail, a cusp of a YCC color gamut is distant apart from a cusp of an sRGB color gamut when the input color space L*a*b*IN, i.e., a YCC color space, is forcibly converted into an sRGB color space by an OS and then the sRGB color space is forcibly converted back into a YCC color space by the OS. Thus, the first gamut mapping operation is performed using the cusp mapping method by which the cusp of the sRGB color gamut is mapped toward the cusp of the SWOP color gamut. Since a cusp of the YCC color gamut is distant apart from a cusp of a printer color gamut when the YCC color space is converted into a printer-output color space, the second gamut mapping operation is performed using the cusp mapping method.

Referring back to FIG. 5, in operation S508, the L*a*b*sRGB-to-CMYKPrinter conversion unit 258 converts the color signal of the printer-output L*a*b* color space L*a*b*Printer produced in operation S506 into a color signal of the printer-output CMYK color space CMYKPrinter using an L*a*b*sRGB-to-CMYKPrinter lookup table which is created in advance based on color signals of an L*a*b* color space obtained by color-measuring color patches of a CMYK color space. In operation S510, the storage unit 260 stores the color signal of the sRGB L*a*b* color space L*a*b*sRGB received in operation S502 and the color signal of the printer-output CMYK color space CMYKPrinter produced in operation S508 at one of the N*N*N lattice points of the lookup table 250_T. In this manner, the creation of the lookup table 250_T is complete.

Referring then to FIG. 4, in operation S430, the third conversion unit 300 converts the color signal of the sRGB L*a*b* color space L*a*b*sRGB produced in operation S420 into a color signal of the printer-output CMYK color space CMYKPrinter using the lookup table 250_T produced by the method illustrated in FIG. 5. The conversion of the color signal of the sRGB L*a*b* color space L*a*b*sRGB into a color signal of the printer-output CMYK color space CMYKPrinter, i.e., operation S430 of FIG. 4, will hereinafter be described in further detail with reference to FIGS. 6A and 6B.

Figure 6A:
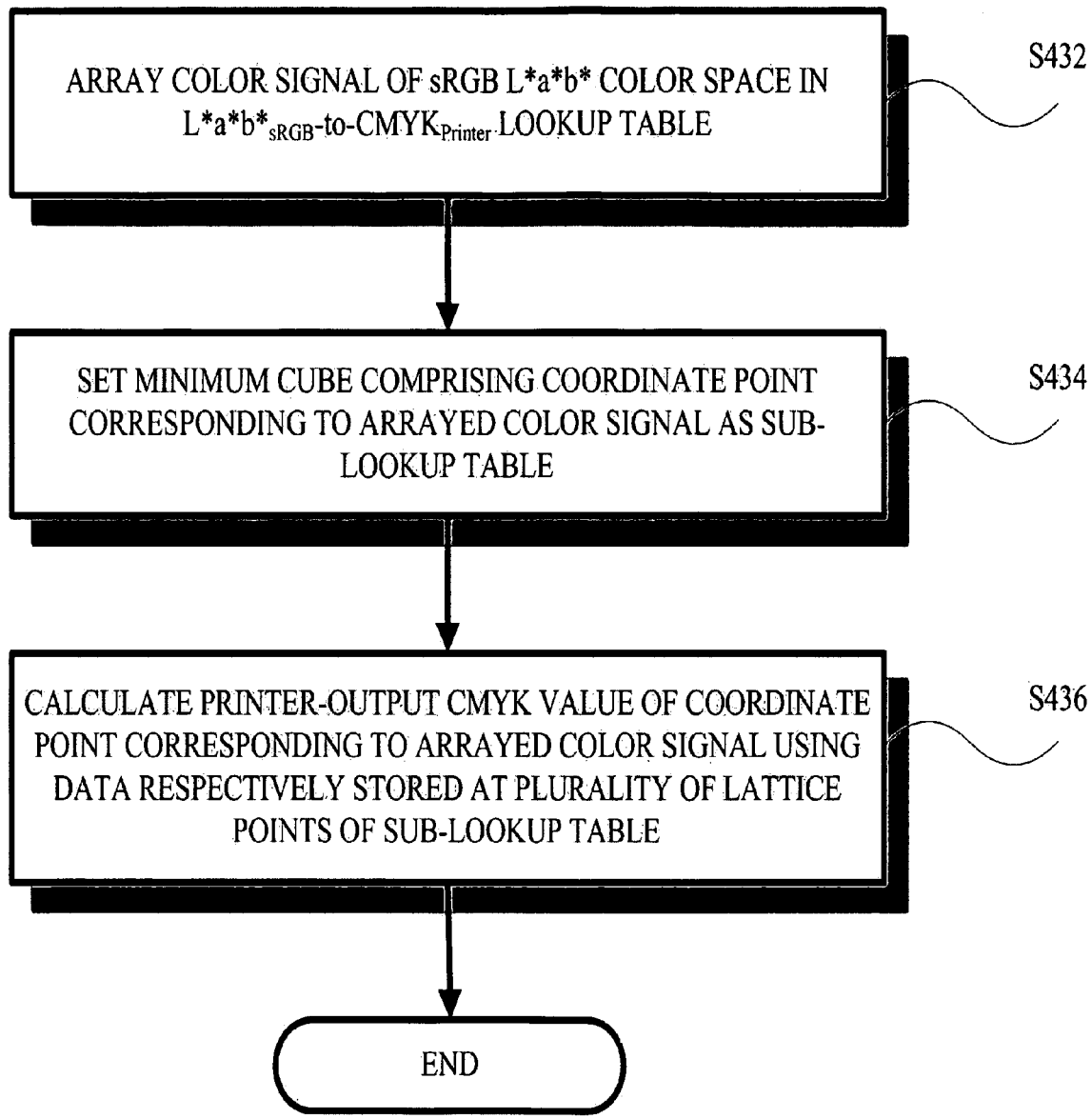
FIG. 6A is a flowchart illustrating a method of converting an input color space into CMYK color space using an L*a*b*sRGB-to-CMYKPrinter lookup table according to another exemplary embodiment of the present invention.
Figure 6B:
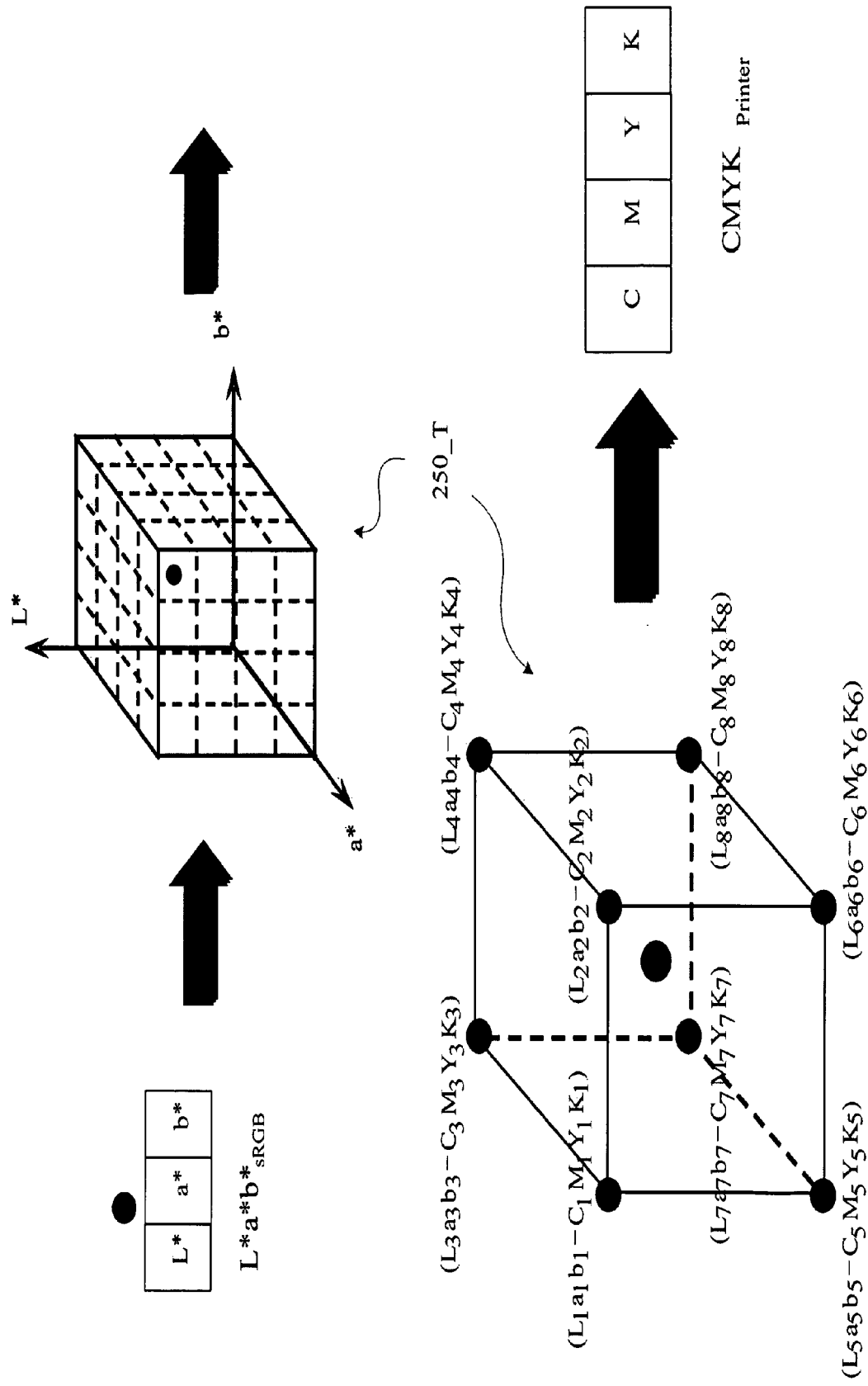
FIG. 6B is a diagram for explaining the method illustrated in FIG. 6A.

FIG. 6A is a flowchart illustrating a method of converting the color signal of an sRGB L*a*b* color space L*a*b*sRGB into a color signal of the printer-output CMYK color space CMYKPrinter using the lookup table 250_T according to an exemplary embodiment of the present invention, and FIG. 6B is a diagram for explaining the method illustrated in FIG. 6A.

Referring to FIG. 6A, in operation S432, the array unit 302 arrays a color signal of the sRGB L*a*b* color space L*a*b*sRGB inside the lookup table 250_T, which is comprised of N*N*N lattice data. In operation S434, the sub-lookup table setting unit 304 searches for a minimum cube which is comprised of eight lattice points surrounding a coordinate point corresponding to the arrayed color signal and sets the detected minimum cube as a sub-lookup table. The sub-lookup table is illustrated in FIG. 6B. Referring to FIG. 6B, the sub-lookup table is comprised of eight lattice points, and eight L*a*b* coordinate point data and eight printer-output CMYK coordinate point data are respectively stored at the eight lattice points, wherein the eight printer-output CMYK coordinate point data respectively correspond to the eight L*a*b* coordinate point data.

In operation S436, if the coordinate point corresponding to the arrayed color signal coincides with one of the eight lattice points of the sub-lookup table, the calculation unit 306 calculates a printer-output CMYK value of the lattice point that coincides with the coordinate point corresponding to the arrayed color signal. In operation S436, if the coordinate point corresponding to the arrayed color signal does not coincide with any of the eight lattice points of the sub-lookup table, the calculation unit 306 calculates a printer CMYK value of the coordinate point corresponding to the arrayed color signal, using an interpolation method.

It is obvious to one of ordinary skill in the art to which the present invention pertains that a method and apparatus for converting an input color space into a CMYK color space and a computer-readable recording medium storing a computer program for executing the method of converting an input color space into a CMYK color space are all within the scope of the present invention.

According to an exemplary embodiment of the present invention, it is possible to allow a printer to realize optimum colors regardless of the type of an input color space by converting a color signal of an sRGB L*a*b* color space, which is obtained from various types of input color spaces, into a color signal of a printe-output CMYK color space using a lookup table.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of converting an input color space into a CMYK color space, the method executed by at least one processor comprising: (a) converting a color signal of an input color space into an sRGB color space; (b) converting the color signal of the sRGB color space into an sRGB L*a*b* color space; and (c) converting the color signal of the sRGB L*a*b* color space into a color signal of a printer-output CMYK color space (CMYKPrinter) using a lookup table.

2. The method of claim 1, wherein the color signal of the input color space comprises one of a color signal of an Adobe RGB color space, a color signal of a YCC color space, or a color signal of a CMYK color space.

3. The method of claim 1, wherein (b) comprises converting the color signal of the sRGB color space into the color signal of the sRGB L*a*b* color space using a profile comprising an sRGB-to-L*a*b* lookup table.

4. The method of claim 1, wherein the look-up table creation comprises:
receiving a color signal of the sRGB L*a*b* color space, which is for N*N*N sRGB data formed in an L*a*b* color space as N*N*N lattice points; converting the received color signal of the sRGB L*a*b* color space into a color signal of the input color space through a first process; converting the color signal of the input color space into a color signal of a printer-output L*a*b* color space (L*a*b*Printer) through a second process; converting the color signal of the printer-output L*a*b* color space into a color signal of the printer-output CMYK color space;

and storing the received color signal of the sRGB L*a*b* color space and the color signal of the printer-output L*a*b* color space at one of the N*N*N lattice points.

5. The method of claim 4, wherein the first process comprises: a first hue shift operation using a first proportional expression by which a hue domain where the color signal of the sRGB L*a*b* color space is located is mapped to a hue domain of the input color space; and a first gamut mapping operation by which a color gamut of the sRGB L*a*b* color space is converted into a color gamut of the input color space.

6. The method of claim 5, wherein the second process comprises: a second hue shift operation using a second proportional expression by which a hue domain where the color signal of the input color space is located is mapped to a hue domain of the printer-output L*a*b* color space; and a second gamut mapping operation by which a color gamut of the input color space is converted into a color gamut of the printer-output L*a*b* color space.

7. The method of claim 4, wherein the conversion of the color signal of the printer-output L*a*b* color space into the color signal of the printer-output CMYK color space comprises: converting the color signal of the printer-output L*a*b* color space into the color signal of the printer-output CMYK color space using an L*a*b*Printer-to-CMYKPrinter lookup table, wherein the CMYKPrinter lookup table is created based on color signals of an L*a*b* color space obtained by color-measuring color patches of a CMYK color space.

8. The method of claim 4, wherein the input color space is an SWOP CMYK color space, an Adobe RGB color space, an scRGB color space, or a YCC color space.

9. The method of claim 6, wherein the input color space is an SWOP CMYK color space, an Adobe RGB color space, an scRGB color space, or YCC color space.

10. The method of claim 9, wherein, if the input color space is the Specifications for Web Offset Publications (SWOP) CMYK color space, the first gamut mapping operation is performed using a nonlinear hue shift operation, and the second gamut mapping operation is performed using a linear hue shift operation.

11. The method of claim 9, wherein, if the input color space is the Adobe RGB color space, the scRGB color space, or the YCC color space, the first gamut mapping operation is performed using a linear hue shift operation, and the second gamut mapping operation is performed using a nonlinear hue shift operation.

12. The method of claim 9, wherein, if the input color space is the SWOP CMYK color space, the first gamut mapping operation is performed using a cusp mapping method, and the second gamut mapping operation is performed using a linear chroma clipping method.

13. The method of claim 9, wherein, if the input color space is the Adobe RGB color space or the scRGB color space, the first gamut mapping operation is performed using a linear chroma clipping method or a linear chroma extension method, and the second gamut mapping operation is performed using a cusp mapping method.

14. The method of claim 9, wherein, if the input color space is the YCC color space, the first gamut mapping operation and the second gamut mapping operation are both performed using a cusp mapping method.

15. The method of claim 4, wherein (c) comprises: (c1) arraying the color signal of the sRGB L*a*b* color space in the lookup table; (c2) setting a minimum cube comprising a coordinate point corresponding to the arrayed color signal as a sub-lookup table; and (c3) calculating a printer-output CMYK value of the coordinate point corresponding to the arrayed color signal using data stored at each of a plurality of lattice points of the sub-lookup table.

16. A computer-readable recording medium which stores a computer program for executing the method of claim 1.

17. An apparatus for converting an input color space into a CMYK color space, comprising: a first conversion unit which converts a color signal of aninput color space into an sRGB color space; a second conversion unit which converts the color signal of the sRGB color space into an sRGB L*a*b* color space; and a third conversion unit which converts the color signal of the sRGB L*a*b* color space into a color signal of a printer-output CMYK color space (CMYKPrinter) using a lookup table.

18. The apparatus of claim 17, wherein the color signal of the input color space is a color signal of an Adobe RGB color space, a color signal of a YCC color space, or a color signal of a CMYK color space.

19. The apparatus of claim 17, wherein the second conversion unit converts the color signal of the sRGB color space into the color signal of the sRGB L*a*b* color space using a profile comprising an sRGB-to-L*a*b* lookup table.

20. The apparatus of claim 17, wherein the lookup table is created by a lookup table creation unit, wherein the lookup table creation unit comprises: an input unit which receives a color signal of the sRGB L*a*b* color space, which is for N*N*N sRGB data formed in an L*a*b* color space as N*N*N lattice points; a first processing unit which converts the received color signal of the sRGB L*a*b* color space into a color signal of the input color space by performing a first process; a second processing unit which converts the color signal of the input color space into a color signal of a printer-output L*a*b* color space (L*a*b*Printer) by performing a second process; an L*a*b*Printer-to-CMYKPrinter conversion unit which converts the color signal of the printer-output L*a*b* color space into a color signal of the printer-output CMYK color space; and a storage unit which stores the received color signal of the sRGB L*a*b* color space and the color signal of the printer-output L*a*b* color space at one of the N*N*N lattice points.

21. The apparatus of claim 20, wherein the first process comprises: a first hue shift operation using a first proportional expression by which a hue domain where the color signal of the sRGB L*a*b* color space is located is mapped to a hue domain of the input color space; and a first gamut mapping operation by which a color gamut of the sRGB L*a*b* color space is converted into a color gamut of the input color space.

22. The apparatus of claim 20, wherein the second process comprises: a second hue shift operation using a second proportional expression by which a hue domain where the color signal of the input color space is located is mapped to a hue domain of the printer-output L*a*b* color space; and a second gamut mapping operation by which a color gamut of the input color space is converted into a color gamut of the printer-output L*a*b* color space.

23. The apparatus of claim 20, wherein the L*a*b*Printer-to-CMYKPrinter conversion unit converts the color signal of the printer-output L*a*b* color space into the color signal of the printer-output CMYK color space using an L*a*b*Printer-to-CMYKPrinter lookup table; and wherein the L*a*b*Printer-to-CMYKPrinter lookup table is created based on color signals of an L*a*b* color space obtained by color-measuring color patches of a CMYK color space.

24. The apparatus of claim 20, wherein the input color space is an SWOP CMYK color space, an Adobe RGB color space, an scRGB color space, or a YCC color space.

25. The apparatus of claim 22, wherein the input color space is an SWOP CMYK color space, an Adobe RGB color space, an scRGB color space, or a YCC color space.

26. The apparatus of claim 25, wherein, if the input color space is the SWOP CMYK color space, the first gamut mapping operation is performed using a nonlinear hue shift operation, and the second gamut mapping operation is performed using a linear hue shift operation.

27. The apparatus of claim 25, wherein, if the input color space is the Adobe RGB color space, the sc RGB color space, or the YCC color space, the first gamut mapping method is performed using a linear hue shift operation, and the second gamut mapping method is performed using a nonlinear hue shift operation.

28. The apparatus of claim 25, wherein, if the input color space is the SWOP CMYK color space, the first gamut mapping operation is performed using a cusp mapping method, and the second gamut mapping operation is performed using a linear chroma clipping method.

29. The apparatus of claim 25, wherein, if the input color space is the Adobe RGB color space or the sc RGB color space, the first gamut mapping operation is performed using a linear chroma clipping method or a linear chroma extension method, and the second gamut mapping operation is performed using a cusp mapping method.

30. The apparatus of claim 25, wherein, if the input color space is the YCC color space, the first gamut mapping operation and the second gamut mapping operation are both performed using a cusp mapping method.

31. The apparatus of claim 17, wherein the third conversion unit comprises:
an array unit which arrays the color signal of the sRGB L*a*b* color space in the lookup table; a sub-lookup table setting unit which sets a minimum cube comprising a coordinate point corresponding to the arrayed color signal as a sub-lookup table; and a calculation unit which calculates a printer-output CMYK value of the coordinate point corresponding to the arrayed color signal using data stored at each of a plurality of lattice points of the sub-lookup table.

* * * * *